United States Patent
Jelks

(10) Patent No.: US 9,769,972 B2
(45) Date of Patent: Sep. 26, 2017

(54) AERATOR FERTILIZER APPARATUS

(71) Applicant: Oscar Jelks, Houston, TX (US)

(72) Inventor: Oscar Jelks, Houston, TX (US)

(*) Notice: Subject to any disclaimer, the term of this patent is extended or adjusted under 35 U.S.C. 154(b) by 0 days.

(21) Appl. No.: 14/545,779

(22) Filed: Jun. 19, 2015

(65) Prior Publication Data

US 2016/0366811 A1 Dec. 22, 2016

(51) Int. Cl.
*A01B 45/02* (2006.01)
*A01B 49/06* (2006.01)
*A01B 63/00* (2006.01)
*A01C 17/00* (2006.01)

(52) U.S. Cl.
CPC .......... *A01B 49/065* (2013.01); *A01B 45/023* (2013.01); *A01B 45/026* (2013.01); *A01B 63/008* (2013.01); *A01C 17/001* (2013.01)

(58) Field of Classification Search
CPC ...... A01B 45/02; A01B 45/023; A01B 45/026
USPC .......................................... 172/21, 174, 784
See application file for complete search history.

(56) References Cited

U.S. PATENT DOCUMENTS

| | | | | |
|---|---|---|---|---|
| 2,197,549 | A * | 4/1940 | Hargrave | E01H 5/12 172/177 |
| 3,247,812 | A * | 4/1966 | Luciano | A01B 45/026 111/133 |
| 5,209,306 | A * | 5/1993 | Whitfield | A01B 45/02 172/118 |
| 5,823,269 | A * | 10/1998 | Leclerc | A01B 45/02 172/21 |
| 8,056,645 | B2 * | 11/2011 | De Bree | A01B 45/023 172/21 |
| 8,162,071 | B2 * | 4/2012 | Barger | A01B 45/026 172/120 |

* cited by examiner

*Primary Examiner* — Gary Hartmann
(74) *Attorney, Agent, or Firm* — Kenneth D. Baugh

(57) ABSTRACT

A self propelled aerator and fertilizer apparatus 10. The apparatus 10 includes an elongated frame 12, having front wheels 20 and rear wheels 22 coupled to the frame. A steering wheel 30 which controls the front wheels 20 is provided so that the apparatus 10 can be moved in a predetermined direction. An aerator 34 is coupled underneath a lower intermediate portion of the frame 12 for aerating the soil upon rotation thereof when the aerator is moved up and down to selectively engage the soil. A fertilizer 90 is coupled to an upper end portion of the elongated frame 12 so that fertilizer can be dispensed into the soil after aeration is accomplished.

5 Claims, 6 Drawing Sheets

AERATOR FERTILIZER APPARATUS

TECHNICAL FIELD

This invention relates to landscaping equipment and more particularly to a device that will fertilize and aerate the soil in the same operation. In order to effectively fertilize the soil it is first necessary to loosen the soil so that fertilization can then be properly accomplished. Normally this is achieved by using two different devices. A first device is used to loosen the soil, and then a second device is used to spread fertilizer into the soil. This two device two step process is necessary because of the need for the fertilizer to be spread down to the roots of the plant life being fertilized. Obviously, the use of two devices to accomplish the needed result is not the most desirable and efficient. Thus one would like to consider an alternative that accomplishes aeration and fertilization without this two device two step process. One alternative is the development of a single aerator fertilizer apparatus. Additionally, such an apparatus ideally would need to be self propelled to maximize and increase efficiency. Such an apparatus is not presently readily available.

Accordingly, it is desirable to have a self propelled device that accomplishes aeration and fertilization in a single apparatus.

BACKGROUND ART

Attempts have been made to provide self propelled devices to facilitate aeration. One such device is illustrated in U.S. Pat. No. 8,459,371B2. In this arrangement an aerator device for attachment to a self propelled lawn mower is disclosed. The device comprises a frame having a proximal end, a distal end and a pair of sides extending between the proximal end and the distal end. An axle is mounted to the frame and extends between the sides of the frame. At least one tine assembly is mounted to the axle for rotation about a tine axis extending longitudinally through the axle. A platform is secured to the frame and extends outwardly from one of the proximal and distal ends of the frame for supporting an operator in front of or behind at least one tine assembly. Another apparatus is disclosed in U.S. Pat. No. 8,255,126B2. This invention discloses an aerator having a flexible frame for use on a sloped or undulating ground surface of golf courses and other turf. The aerator includes a pair of frame sections linked together at a horizontal pivot axis, one of the frame section supporting a coring head. A ground sensor is pivotably attached to one of the frame sections so that the ground sensor may pivot in response to changes in ground slope and provide output relating to the magnitude of the change. Based on the output, a flex frame actuator pivots the pair of frame sections with respect to each other. Although devices such as these may achieve one of the desired results these devices do not accomplish aeration and fertilization. These devices still require another device to accomplish fertilization. Thus the problem remains the same two devices are required. Therefore there is an ongoing need for a single self propelled device that will allow aeration and fertilization of the soil.

DISCLOSURE OF THE INVENTION

A self propelled aerator and fertilizer apparatus is provided. This apparatus is an aerator fertilizer device which has one component which aerates the soil while enabling a fertilizer component to deposit it's fertilize into the soil.

The self propelled aerator and fertilizer apparatus for aerating and fertilizing soil includes an elongated frame having a pair of front wheels rotably mounted to the front of the frame, and a pair of rear wheels rotably mounted to the rear of the frame. A steering means is provided for controlling the first pair of wheels so that the frame can be moved in a predetermined direction. An aerator member is coupled underneath a lower intermediate portion of the elongated frame for aerating the soil. The apparatus also includes a means for rotating the aerator member adjacent the soil and a means for lifting the aerator member is also provided so that the aerator member can be moved up and down to selectively engage the soil. A fertilizer member is also provided which is coupled to an upper end portion of the elongated frame for dispensing fertilizer into the soil after aeration has occurred.

BRIEF DESCRIPTION OF THE DRAWING

The details of the invention will be described in connection with the accompanying drawing in which.

BEST MODE FOR CARRYING OUT THE INVENTION

Figure 1:
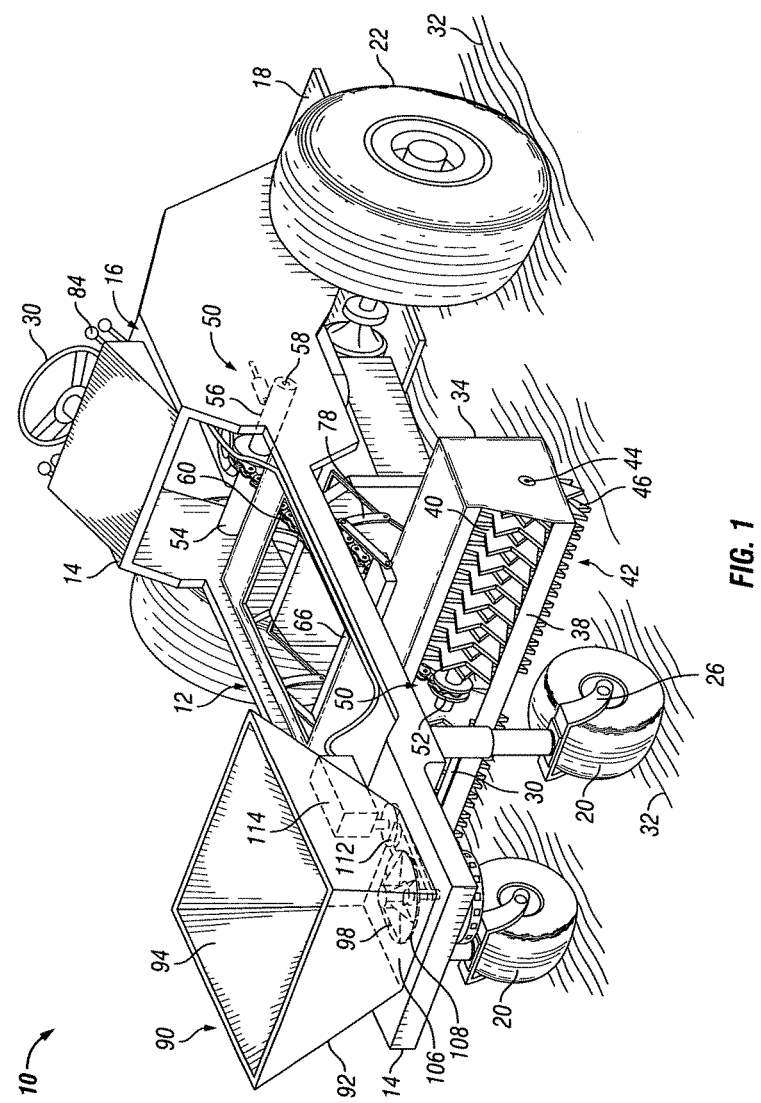
FIG. 1 is a perspective view illustrating an aerator fertilizer apparatus in accordance with the principles of the invention.
Figure 2:
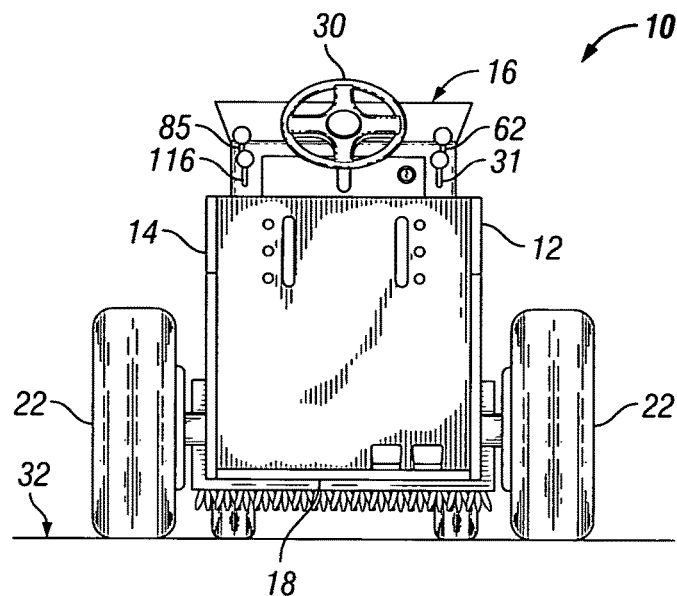
FIG. 2 is an end view of an aerator fertilizer apparatus illustrated in FIG. 1 in accordance with the principles of the invention.
Figure 3:
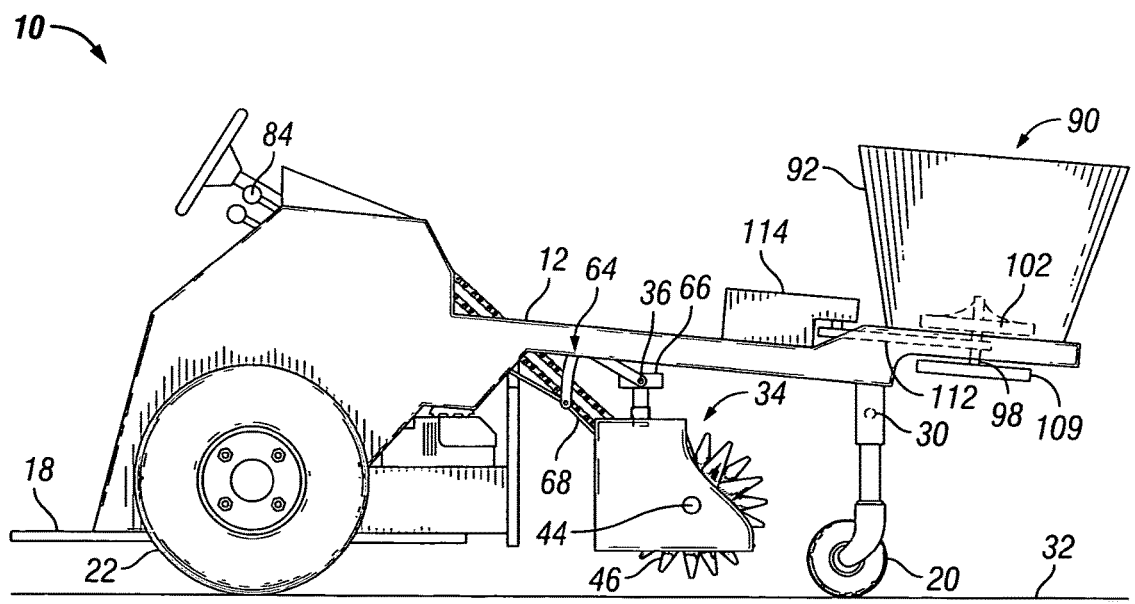
FIG. 3 is a side view of an aerator fertilizer apparatus illustrated in FIG. 1 in accordance with the principles of the invention.

Referring to FIGS. 1 through 3 there is shown, an aerator fertilizer apparatus, generally designated, by the numeral, 10. The aerator fertilizer apparatus 10 is provided with an elongated frame generally, designated, by the numeral 12. The frame 12 is provided with an upper support member 14 having a control panel generally designated, by the numeral 16 (FIG. 2) and a lower platform support member 18 (to support a user not shown) adjacent the lower portion of the control panel. The aerator fertilizer apparatus 10 is propelled by a drive (not shown) such as, for example by an internal combustion engine. The aerator fertilizer 10 is provided with front and rear wheels, generally designated, by the numerals, 20 and 22, respectively which are coupled for rotation in a well known manner to the frame 12. In the typical rear wheel drive vehicle the front wheels 20 are the driven wheels and the rear wheels 22 are the drive wheels. The front and rear wheels 20 and 22 are mounted to the frame member 12 so that the front wheels can be controlled by a steering column assembly 30 in a well known manner thus allowing the front wheels 20 to be turned as desired and moved along a ground or soil surface 32 when the aerator fertilizer apparatus 10 is activated by a activator member 31 on the control panel 16.

The aerator fertilizer apparatus 10 is provided with an aerator component, generally designated, by the numeral, 34 (FIG. 4) which is coupled underneath a lower intermediate portion of the frame 12. The aerator component 34 includes a substantially rectangularly shaped support member, generally designated, by the numeral 38 having an open area 40. An axle assembly, generally designated, by the numeral 42 is provided including an axle 44 supported in the opening area 40 of the rectangular shaped support member 38. A plurality of pointed elongated members, generally designated, by the numeral 46 are coupled around the axle 44 so that they protrude therefrom in a predetermined pattern to selectively engage the ground surface or soil 32 and punch holes therein.

As illustrated in (FIGS. 1-4) a gear assembly generally designated by the numeral 50 is provided with a first gear 52 rotably coupled to an intermediate portion of the axle 44, a guide member 54 coupled to an upper portion of the frame 12 and a second gear 56 ratably coupled to the guide member. The guide member 54 includes a shaft 58 which couples the guide member 54 to the frame 12. A belt or chain 60 is aligned to extend around the gear 52 and gear 56 to cause the axle 44 to rotate. An activating apparatus such as for example a solenoid 61 is coupled to the drive (not shown) and the control panel 16 in well known manner, to allow the axle 44 to be activated for rotation when desired at the control panel by an activating member 62. When activated the chain 60 is moved to rotate the axle 44 thereby rotating the elongated members 46.

Figure 4:
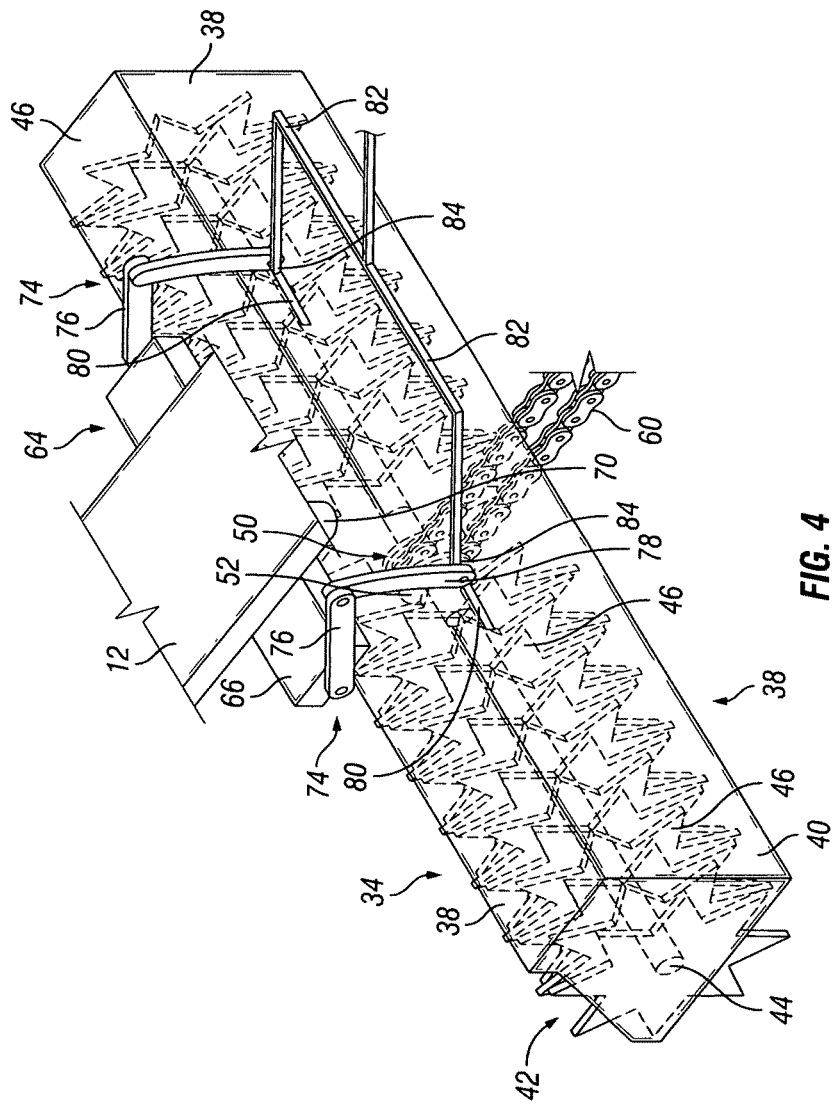
FIG. 4 is a exposed view of the aerator component illustrated in FIG. 4 of the aerator fertilizer apparatus in accordance with the principles of the invention.
Figure 6:
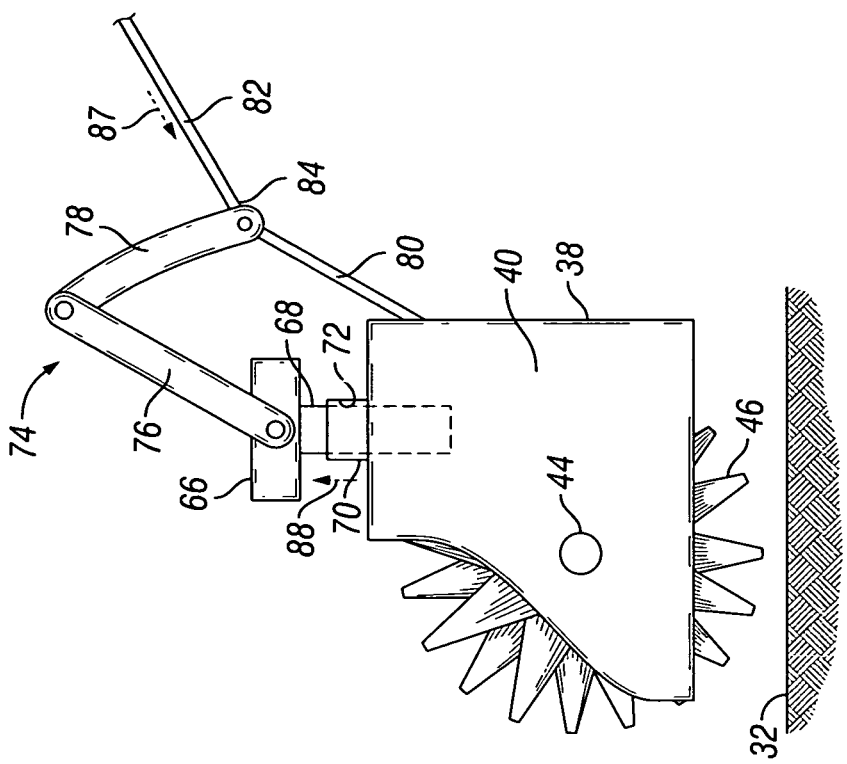
FIG. 6 is a partial view of the lifting and lowering mechanism of the aerator component illustrated in FIG. 4 showing the aerator in the raised position in accordance with the principle of the invention.
Figure 5:
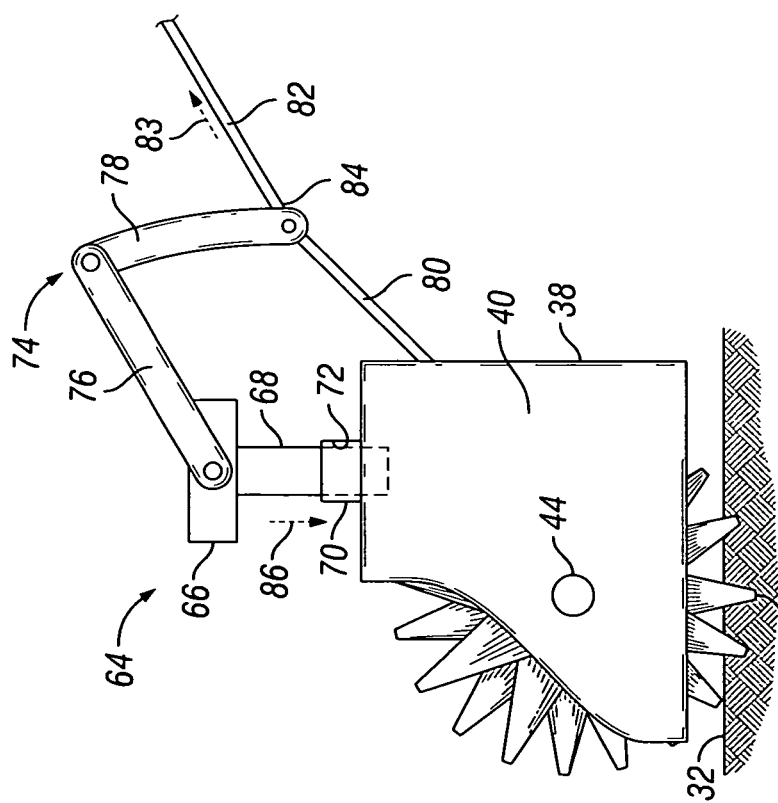
FIG. 5 is partial view of the lifting and lowering mechanism of the aerator component illustrated in FIG. 4 showing the aerator in the lowered position in accordance with the principles of the invention.

Referring to FIGS. 4, 5 and 6 a lift assembly generally designated by the numeral 64 is provided to allow the aerator component 34 to be selectively moved up and down when in operation. This allows the elongated members 40 to engage an adjacently aligned portion of the surface or soil 32 when the lift assembly 64 is moved to cause the aerator 34 to move downward into adjacent aligned engagement with the surface.

The lift assembly 64 is provided with a horizontally extending support member 66 coupled to upper portions of the rectangular shaped member 38. The lift assembly 64 also includes a pair of spaced vertically extending members 68 (FIGS. 5 & 6) which are coupled to the horizontally extending support member 66. A pair of raised members 70 having apertures 72 formed therein are aligned adjacent the members 68 so that they can extend through the aperture 72 into the open area 40 of the support member 38. The lift assembly also includes a handle assembly generally designated by the numeral 74 on each end of the horizontally extending support member 66. The handle assembly 74 is provided with a diagonally extended member 76 which is coupled to the horizontally extending support member 66. A vertically descending member 78 is coupled at one end to the other end of the diagonally extending member 76. The other end of the vertically descending member 78 is pivotally coupled to a support rod 80 coupled to and extending from the housing 38. A U-shaped cable assembly 82 (FIG. 4) has an end 84 thereof coupled to the end of the vertically descending member 78. When the cable assembly 82 is pulled in the direction of arrow 83 (FIG. 5) by activation at the control panel by a level 85 the lift assembly causes the aerator 38 to move down as indicted by the arrow 86 (FIG. 5) to the downward position so that the elongated member 46 can engage and puncture the surface or soil 32. When the level 85 is released in direction of arrow 87 (FIG. 6) the aerator 38 moves up as indicated by arrow 88 so that the elongated members 46 disengage from the surface or soil 32.

Figure 7:
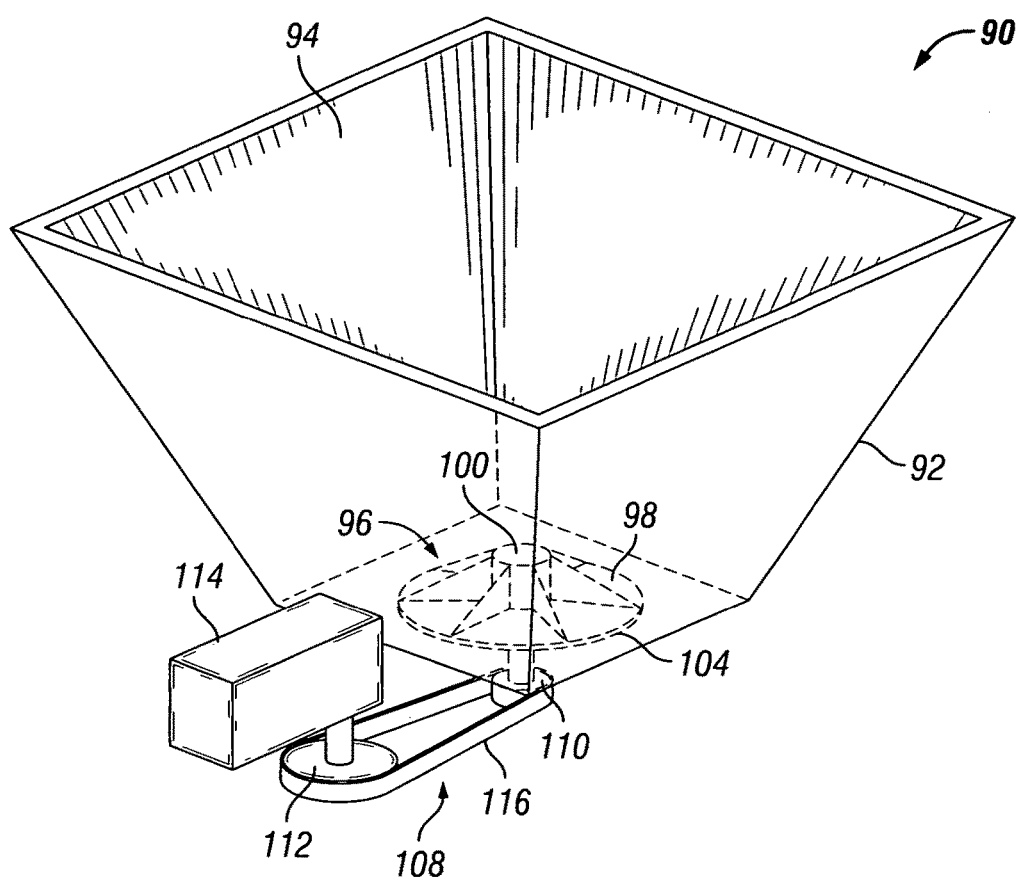
FIG. 7 is an internal perspective view of the fertilizer component illustrated in FIG. 3 of the aerator fertilizer apparatus in accordance with the principles of the invention.
Figure 8:
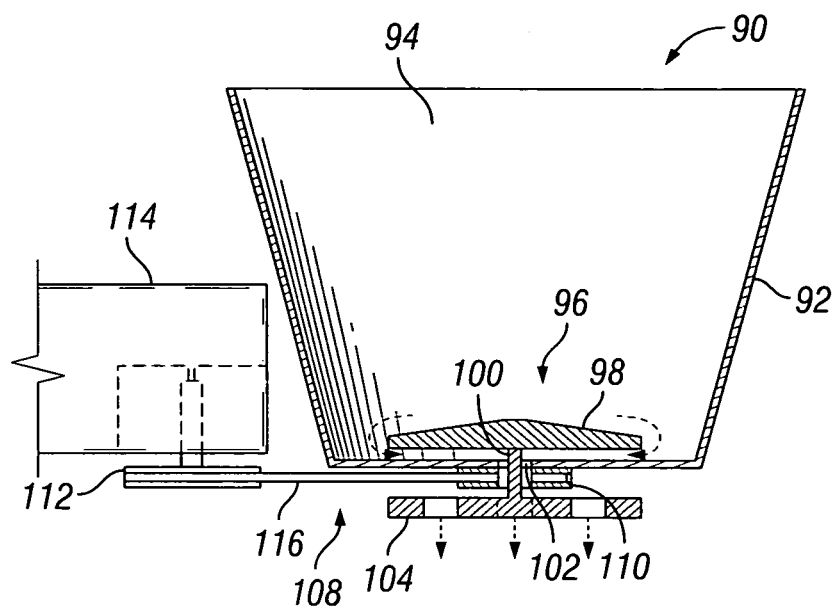
FIG. 8 is a side cross-sectional view of the fertilizer component taken alone lines 8-8 in FIG. 2 of the aerator fertilizer apparatus in accordance with the principles of the invention.
Figure 9:
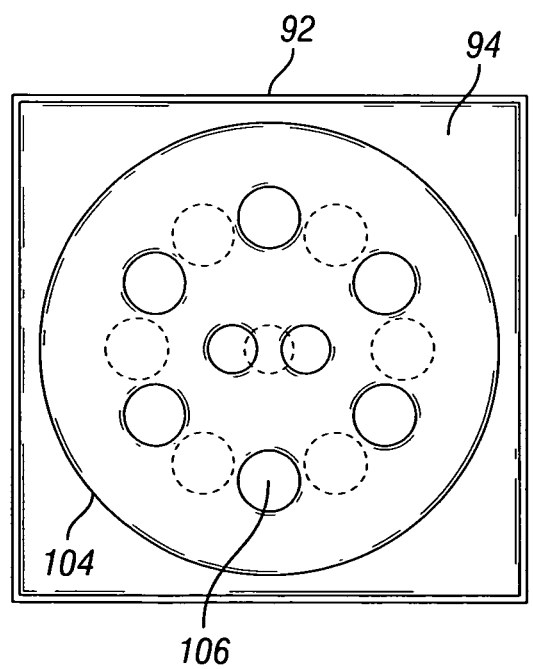
FIG. 9 is a bottom view of the fertilizer component illustrated in FIG. 8 of the aerator fertilizer apparatus in accordance with the principles of the invention.

The aerator fertilizer apparatus 10 is also provided with a fertilizing component, generally designated, by the numeral, 90 (FIGS. 7, 8, and 9) which is coupled to an upper end portion of the frame 12. The fertilizing component 90 is provided with a upstanding rectangular shaped fertilizing container 92 having an open area 94 formed therein. The fertilizer component 90 is also provided with a fertilizer spreading apparatus generally designated, by the numeral 96. The apparatus 96 includes an upper member 98 mounted in the container 92 which is rotably mounted on one end to a shaft 100 (FIG. 8) which extends through an opening 102 in the lower portion of the container. A lower member 104 having apertures 106 (FIG. 9) therein is mounted on the other end of the shaft 100. The shaft 100 is mounted for rotation by a pulley assembly generally designated, by the numeral 108. The pulley assembly 108 includes a pulley 110 coupled to the shaft 100 and a pulley 112 coupled to an electric motor 114 which receives electric power from the drive (not shown) and functions in a well known manner. A belt 116 is provided around the pulley 110 and 112 to allow the pulleys to rotate when the motor 114 is activated from the control panel by the control 116. When the motor 114 is activated this causes fertilizer in the container 92 to pass through the opening 102 into the apertures 106 and into the punctures in the surface 32 made by the elongated members thereby providing fertilization.

When it is desired to use the aerator fertilizer apparatus 10. A user is positioned on platform support member 18 and the apparatus 10 is activated by the control 16 to move in a desired direction. The aerator component 34 is activated by the activating member 46 to rotate the axle 44 and elongated members 46. The aerator 34 is then moved to a downward position by the lift assembly 64 so that the elongated members engage and puncture the surface or soil 32. Simultaneously the fertilizer component 90 is activated by the control 116 resulting in fertilizer being spread on and into the surface 32 as the apparatus 10 moves along the surface in a predetermined direction.

The invention has been shown and described in what is considered to be the most practical and preferred embodiments. However, it should be recognized that changes may be made by those skilled in the art without departing from the spirit and scope of the invention.

What is claimed:

1. A self propelled aerator and fertilizer apparatus for aerating and fertilizing soil including:
    an elongated frame support member;
    a first spaced pair of wheels, each one of the pair of wheels rotably mounted to a side of a front portion of the elongated frame support member;
    a second spaced pair of wheels, each one of the pair of wheels rotably mounted to a side of a rear portion of the elongated frame support member;
    a means for steering the first pair of wheels so that the elongated frame support member can be moved in a predetermined direction;
    an aerator member having a rectangularly shaped support member with an open area formed therein, coupled underneath a lower intermediate portion of the elongated frame support member, an axle rotably supported in the open area of the rectangularly shaped support member, and a plurality of spaced elongated members coupled around the axle so that the elongated members protrude therefrom in a predetermined pattern to selectively engage and aerate the soil;

a means for rotating portions of the aerator member adjacent the soil;

a horizontally extending support member coupled to upper portions of the rectangular shaped support member;

a pair of spaced vertically extending members coupled to the horizontally extending support member;

a pair of raised members having apertures formed therein aligned adjacent the pair of vertically extending members so that the vertically extending members can extend through the apertures into the support member;

a first diagonally extending member coupled to one end of the horizontally extending support member;

a second diagonally extending member coupled to another end of the horizontally extending support member;

a first vertically descending member coupled at one end to another end of the first diagonally extending member;

a second vertically descending member coupled at one end to another end of the second diagonally extending member;

a first support rod coupled to extend from the rectangularly shaped support member and pivotably coupled to another end of the first vertically descending member;

a second support rod coupled to extend from the rectangularly shaped support member and pivotably coupled to another end of the second vertically descending member;

a cable member having a first end thereof coupled to the first vertically descending member adjacent to the first support rod and the second end thereof coupled to the second vertically descending member adjacent the second support rod so that when the cable is pulled in one direction the aerator moves down, allowing the elongated members to engage and puncture the soil and so that when the cable is pulled in a second direction the aerator moves up allowing the elongated members to be removed from the soil; and a fertilizer member coupled to an upper end portion of the elongated frame support member for dispensing fertilizer into the soil.

2. A self propelled aerator and fertilizer apparatus as defined in claim 1 wherein the elongated frame support member includes;

an upper support member;

a control panel coupled to the upper support member; and a lower platform support member aligned adjacent the lower portion of the control panel for supporting a user thereon adjacent the steering means.

3. A self propelled aerator and fertilizer apparatus as defined in claim 2 wherein the means for rotating the aerator member includes:

a first gear member rotably coupled to an intermediate portion of the axle;

a guide member coupled to an upper portion of the elongated frame support member;

a second gear member rotably coupled to the guide member; and a belt aligned to extend around the first gear member, and the second gear member so that the axle can be selectively activated for rotation thereby rotating the elongated members.

4. A self propelled aerator and fertilizer apparatus as defined in claim 3 wherein the fertilizer member includes:

an upstanding rectangularly shaped container having an open area formed therein; and a fertilizer spreading member coupled for rotation in a lower portion of the open area of the upstanding rectangularly shaped container.

5. A self propelled aerator and fertilizer apparatus as defined in claim 4 wherein the fertilizer spreading member includes:

an upper member mounted in the open area of the container;

a shaft rotably mounted at one end thereof to the upper member and extending through portions of the container;

a lower member having apertures formed therein mounted to another end of the shaft;

a first pulley coupled to the shaft adjacent the lower member;

a second pulley aligned adjacent the first pulley; and a belt coupled around the first and second pulleys so that the pulleys can be activated for rotation thereby causing fertilize to pass through the container into the soil.

\* \* \* \* \*